United States Patent
Yue et al.

(10) Patent No.: US 11,613,478 B2
(45) Date of Patent: Mar. 28, 2023

(54) EVAPORATOR FOR SUBMERGED COMBUSTION AND DELAYED EVAPORATION, METHOD OF THE SAME AND A SYSTEM OF COMBINED EVAPORATION DEVICES

(71) Applicant: TSINGHUA UNIVERSITY, Beijing (CN)

(72) Inventors: Dongbei Yue, Beijing (CN); Xinwei Dong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/450,293

(22) Filed: Oct. 8, 2021

(65) Prior Publication Data
US 2022/0112098 A1   Apr. 14, 2022

(30) Foreign Application Priority Data

Oct. 9, 2020   (CN) .......................... 202011074911.0

(51) Int. Cl.
| | |
|---|---|
| *B01D 1/14* | (2006.01) |
| *C02F 1/04* | (2023.01) |
| *B01D 1/00* | (2006.01) |
| *B01D 1/28* | (2006.01) |
| *C02F 1/10* | (2023.01) |

(52) U.S. Cl.
CPC ............ *C02F 1/041* (2013.01); *B01D 1/0058* (2013.01); *B01D 1/0064* (2013.01); *B01D 1/14* (2013.01); *B01D 1/28* (2013.01); *C02F 1/043* (2013.01); *C02F 1/10* (2013.01); *C02F 2303/10* (2013.01)

(58) Field of Classification Search
CPC .. C02F 1/10; C02F 1/041; C02F 1/043; C02F 2303/10; B01D 1/0058; B01D 1/0064; B01D 1/14; B01D 1/28
See application file for complete search history.

(56) References Cited

U.S. PATENT DOCUMENTS

| | | | | |
|---|---|---|---|---|
| 5,082,525 A | * | 1/1992 | Travis ..................... | C02F 1/048 159/40 |
| 5,097,802 A | * | 3/1992 | Clawson ................. | F24H 1/107 122/31.1 |
| 5,381,742 A | * | 1/1995 | Linton .................... | F24H 1/107 110/238 |

(Continued)

*Primary Examiner* — Jonathan Miller
(74) *Attorney, Agent, or Firm* — Grossman Tucker Perreault & Pfleger, PLLC

(57) ABSTRACT

An evaporator for submerged combustion and delayed evaporation, a method of the same and a system of combined evaporation devices, the evaporator for submerged combustion and delayed evaporation comprises: a housing formed with a space for containing an evaporating liquid; a separator plate arranged in an interior of the housing and dividing the housing into a heat transfer (submerged combustion) area and an evaporation area; a vapor chamber located above a liquid surface of the evaporation area; a flue gas chamber located above a liquid surface of the heat transfer area, wherein the flue gas chamber is provided with a flue gas outlet, the flue gas outlet is provided with a pressure valve which is capable of controlling a gas pressure within the flue gas chamber such that a gas pressure within the flue gas chamber is larger than a gas pressure within the vapor chamber.

13 Claims, 2 Drawing Sheets

(56) References Cited

U.S. PATENT DOCUMENTS

| | | | | |
|---|---|---|---|---|
| 6,293,277 B1* | 9/2001 | Panz | ..................... | F24H 1/107 |
| | | | | 122/31.2 |
| 6,338,337 B1* | 1/2002 | Panz | ..................... | F24H 1/107 |
| | | | | 122/31.2 |
| 6,913,671 B2* | 7/2005 | Bolton | .................... | B01D 1/30 |
| | | | | 159/44 |
| 7,832,714 B2* | 11/2010 | Duesel, Jr. | ............... | C02F 1/14 |
| | | | | 261/123 |
| 7,845,314 B2* | 12/2010 | Smith | ................. | B01D 1/0058 |
| | | | | 122/379 |
| 8,425,668 B2* | 4/2013 | Lakatos | ................... | C02F 1/12 |
| | | | | 95/266 |
| 8,852,394 B2* | 10/2014 | Panz | ..................... | B01D 1/14 |
| | | | | 202/175 |
| 10,780,368 B2* | 9/2020 | Zupancic | ................ | B01D 1/14 |
| 10,907,828 B2* | 2/2021 | Yue | .......................... | F23G 5/16 |
| 2008/0173590 A1* | 7/2008 | Duesel | .................... | B01D 1/14 |
| | | | | 210/519 |
| 2019/0282918 A1* | 9/2019 | Zupancic | ............... | B01D 1/14 |

\* cited by examiner

EVAPORATOR FOR SUBMERGED COMBUSTION AND DELAYED EVAPORATION, METHOD OF THE SAME AND A SYSTEM OF COMBINED EVAPORATION DEVICES

FIELD

The present disclosure relates to the field of environmentally protective high-salinity wastewater treatment and in particular to a evaporator for submerged combustion and delayed evaporation, a method of the same and a system of combined evaporation devices.

BACKGROUND

Prior submerged combustion evaporators directly introduce a high-temperature flue gas into an evaporating liquid to realize evaporation, where the heat transfer process and the evaporation process take place simultaneously. As a result, the vapor obtained from evaporation is mixed with flue gas and thus cannot be directly used at high efficiency by the evaporator.

Currently, the mixed gas of vapor and flue gas can heat the evaporating liquid to a higher temperature by means of heat exchange using a heat exchanger. However, the temperature difference between the mixed gas and the evaporating liquid is very slight, and a large amount of latent heat in the vapor cannot be effectively utilized before discharge, leading to a waste of energy. As a result, the overall energy consumption of the submerged combustion evaporator is relatively high.

SUMMARY

The present disclosure proposes an evaporator for submerged combustion and delayed evaporation, which is capable of collecting pure vapor during submerged combustion evaporation so as to utilize the latent heat of the vapor.

The present disclosure provides an evaporator for submerged combustion and delayed evaporation, a method of the same and a system of combined evaporation devices, comprises:

a housing formed with a space for containing an evaporating liquid;

a separator plate arranged in an interior of the housing and dividing the housing into a heat transfer (submerged combustion) area and an evaporation area;

a vapor chamber located above a liquid surface of the evaporation area;

a flue gas chamber located above a liquid surface of the heat transfer area, wherein the flue gas chamber is provided with a flue gas outlet, the flue gas outlet is provided with a pressure valve which is capable of controlling a gas pressure within the flue gas chamber such that the gas pressure within the flue gas chamber is larger than a gas pressure within the vapor chamber, and the liquid surface level of the evaporating liquid in the evaporation area is higher than that in the heat transfer area.

Preferably, the vapor chamber is provided with a vapor outlet which is connected with a vacuum pump, and the vacuum pump is capable of establishing a negative pressure within the vapor chamber.

Preferably, in a direction from above towards below, the separator plate is inclined towards a side where the evaporation area is located, so that the separator plate is capable of guiding bubbles existing and floating in the evaporating liquid to a side where the heat transfer area is located.

Preferably, the evaporator for submerged combustion and delayed evaporation further comprises:

a flow deflector plate including a first flow deflecting section located in the heat transfer area and a second flow deflecting section, wherein in a direction from the heat transfer area towards the evaporation area, the first flow deflecting section is inclined downwardly, and the second flow deflecting section extends in an up-and-down direction in the evaporation area.

Preferably, the flow deflector plate is substantially formed as a V shape, the separator plate is located between the first flow deflecting section and the second flow deflecting section so as to extend into an area surrounded by the flow deflector plate, wherein a connection portion between the first flow deflecting section and the second flow deflecting section as a bottom portion of the V shape forms a recess portion which is connected with a discharge tube opening to a bottom portion of the evaporation area, solid crystals in the area surrounded by the flow deflector plate is deposited and gathered at the recess portion.

Preferably, the first flow deflecting section is connected with a baffle located at an upper end portion of the first flow deflecting section, the baffle is capable of allowing a liquid to pass while blocking bubbles in the liquid.

Preferably, the evaporator for submerged combustion and delayed evaporation further comprises:

a Venturi injector including an injector liquid inlet, an injector liquid outlet, and an air suction port, wherein the injector liquid inlet is communicated with the evaporation area via a first pipeline, the injector liquid outlet is communicated with the heat transfer area, and the air suction port is communicated with the flue gas outlet via a second pipeline, wherein the first pipeline is connected with a pump for pumping the evaporating liquid in the evaporation area through the first pipeline to the heat transfer area via the Venturi injector, a gas discharged from the flue gas outlet is at least partially sucked into the air suction port of the Venturi injector and introduced into the heat transfer area with the evaporating liquid.

The present disclosure further provides a method for submerged combustion and delayed evaporation comprises the following steps:

using a separator plate to separate a space for containing an evaporating liquid to form a heat transfer (submerged combustion) area and an evaporation area which communicate with each other at a bottom portion;

introducing a combustion-supporting gas and a combustible gas or introducing a high-temperature flue gas into the heat transfer area;

making a gas pressure within a flue gas chamber above a liquid surface of the heat transfer area to be larger than a gas pressure within a vapor chamber above a liquid surface of the evaporation area, and a liquid surface level of the evaporating liquid in the heat transfer area to be lower than a liquid surface level of the evaporating liquid in the evaporation area, wherein the evaporating liquid is mainly heated in the heat transfer (submerged combustion) area and then evaporated in the evaporation area, a vapor generated from the evaporating liquid evaporation is mainly collected in the vapor chamber.

Preferably, the method comprises using a flow deflector plate to guide a flow direction of the evaporating liquid such that the evaporating liquid is capable of circulating in the heat transfer area and the evaporation area around the flow deflector plate.

The present disclosure further provides a system of combined evaporation devices comprises:

the evaporator for submerged combustion and delayed evaporation according to any one of the above solutions; and a primary evaporator provided at an upstream side of the evaporator for submerged combustion and delayed evaporation, wherein an evaporating liquid is evaporated and concentrated by the primary evaporator and then introduced into the evaporator for submerged combustion and delayed evaporation.

Preferably, a system of combined evaporation devices further comprises a compressor including a compressor vapor inlet connected with a vapor outlet of the vapor chamber and a compressor vapor outlet connected with a primary evaporator gas inlet of the primary evaporator, wherein the primary evaporator is a mechanical vapor compression evaporator.

Preferably, a system of combined evaporation devices further comprises a preheater configured to heat an evaporating liquid and including a preheater liquid inlet, a preheater liquid outlet, a preheater gas inlet, and a preheater gas outlet, wherein the preheater liquid inlet is configured to introduce the evaporating liquid, the preheater gas inlet is connected with the flue gas outlet, and the preheater liquid outlet is connected with a primary evaporator liquid inlet of the primary evaporator so that the heated evaporating liquid is introduced into the primary evaporator.

Through the above technical solutions, the evaporator for submerged combustion and delayed evaporation is separated into two portions, including a heat transfer (submerged combustion) area where the evaporating liquid is heated (where a small amount of evaporation or solute precipitation may occur) and an evaporation area where the evaporating liquid is evaporated, thereby facilitating collection of pure vapor. As such, it is possible to reduce the power consumption of the submerged combustion evaporator using the latent heat of the vapor.

DETAILED DESCRIPTION

To elaborate the above objective, characteristics and advantages of the present disclosure more explicitly, the detailed embodiments of the present disclosure are described herein in conjunction with the accompanying drawing. The present disclosure can be implemented in other different ways or forms, in addition to various embodiments described herein. Corresponding improvements, modifications and replacements may occur to one skilled in the art without departing from the spirit of the present disclosure, the present disclosure therefore is not limited to the described embodiments herein. The scope of protection of the present disclosure for invention is subject to the claims.

Figure 1:
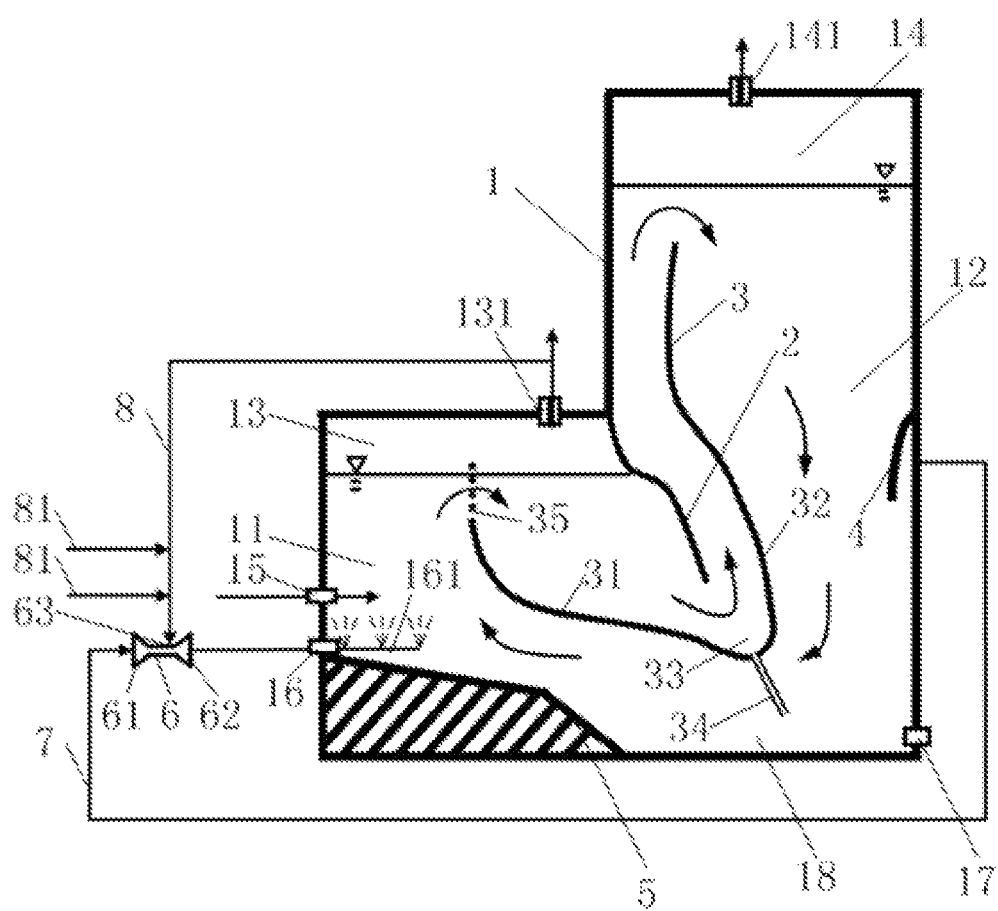
FIG. 1 is a structural diagram of the evaporator for submerged combustion and delayed evaporation according to an embodiment of the present disclosure.

As shown in FIG. 1, the present disclosure provides an evaporator for submerged combustion and delayed evaporation, comprising a housing 1, a separator plate 2, a flow deflector plate 3, a slag trap plate 4, a slope 5 and a Venturi injector 6.

The housing 1 is formed with a space for containing an evaporating liquid. The interior of the housing 1 is divided into a heat transfer (submerged combustion) area 11 and an evaporation area 12 by a separator plate 2. The separator plate 2 extends substantially in the up-and-down direction of the housing 1. The heat transfer area 11 and the evaporation area 12 are located on the left and the right sides of the separator plate 2. As shown in FIG. 1, in the interior of the housing 1, the area on the left side of the separator plate 2 is the heat transfer area 11, and the area on the right side of the separator plate 2 is the evaporation area 12. The separator plate 2 may be connected with the top of the housing 1. The separator plate 2 and the bottom of the housing 1 have an interval therebetween which allows the heat transfer area 11 and the evaporation area 12 communicating with each other.

The area above the liquid surface of the heat transfer area 11 is a flue gas chamber 13. The area above the liquid surface of the evaporation area 12 is a vapor chamber 14. The level of the liquid surface in the heat transfer area 11 is higher than the level of the lower end of the separator plate 2. A mixed gas of the flue gas introduced into the heat transfer area 11 and a small amount of vapor generated by evaporation may be stored in the flue gas chamber 13.

In a direction from above towards below, the separator plate 2 is inclined toward the side where the evaporation area 12 is located. When bubbles (flue gas) float in the evaporating liquid, the separator plate 2 may guide the bubbles to the flue gas chamber 13 on the side where the heat transfer area 11 is located, such that the bubbles seldom or do not enter the vapor chamber 14 on the side where the evaporation area 12 is located.

The flue gas chamber 13 is provided with a flue gas outlet 131. A pressure valve is attached to the flue gas outlet 131 which is capable of maintaining the gas pressure within the flue gas chamber 13 stable and adjusting it and is capable of controlling the flue gas outlet 131 to open or close. For example, the pressure valve may control the gas pressure within the flue gas chamber 13 to be higher than the atmospheric pressure, so that the heat transfer area 11 and the evaporation area 12 form a difference in liquid surface level and the evaporating liquid of the heat transfer area 11 has higher boiling point, which avoids the evaporating liquid evaporated in the heat transfer area 11 as much as possible.

The gas pressure within the flue gas chamber 13 is made larger than the gas pressure within the vapor chamber 14 through controlling the pressure valve. As such, the liquid surface of the evaporating liquid is possible to be at a lower level in the heat transfer area 11 than in the evaporation area 12. Thereby, the housing 1 may have different heights in the heat transfer area 11 and the evaporation area 12. The height of the housing 1 at the top of the heat transfer area 11 is lower than the height of the housing 1 at the top of the evaporation area 12. For example, the housing 1 may have an L-shaped cross-sectional surface. The housing 1 may be formed by splicing panels, of which the fabrication cost is lower than that of a cylindrical housing.

The vapor chamber 14 is further provided with a vapor outlet 141 which may be connected with a vacuum pump. The vacuum pump may establish a negative pressure within the vapor chamber 14.

If the negative pressure is maintained in the vapor chamber, the desire difference in the boiling point of the evaporating liquid between the heat transfer area 11 and the evaporation area 12 may be reduced, thereby the difference in liquid surface level of the evaporating liquid between the heat transfer area 11 and the evaporation area 12 may be reduced. As such, the total height of the apparatus is reduced, achieving a relatively small size of the apparatus.

Since the change of the boiling point of the evaporating liquid as the pressure changes becomes more obvious under a negative pressure, in a case where the evaporating liquid has the same boiling point in the heat transfer area 11 and the evaporation area 12, the lower the gas pressure is within the flue gas chamber 13 and the vapor chamber 14, the smaller the difference in liquid surface level is between the heat transfer area 11 and the evaporation area 12. As compared with the case where the gas pressure within the vapor chamber 14 equals to the atmospheric pressure, in the case where a negative pressure is established within the vapor chamber 14 by the vacuum pump, the desire boiling point and the desire difference in boiling point of the evaporating liquid in the transfer area 11 and the evaporation area 12 may decrease, and the gas pressure within the flue gas chamber 13 may decrease for example to close to the atmospheric pressure. Also, the difference in gas pressure between the flue gas chamber 13 and the vapor chamber 14 may decrease. Accordingly, the difference in the liquid surface level of the evaporating liquid between the heat transfer area 11 and the evaporation area 12 may be reduced.

Due to the pressure difference formed between the flue gas chamber 13 and the vapor chamber 14, the liquid surface level of the evaporating liquid in the heat transfer area 11 may be 3 to 5 meters lower than that in the evaporation area 12.

It is appreciated that, if the pressure within the vapor chamber 14 substantially equals to the atmospheric pressure, and the gas pressure within the flue gas chamber 13 is larger than the atmospheric pressure, and the liquid surface level of the evaporating liquid in the heat transfer area 11 may be 4 to 5 meters lower than that in the evaporation area 12. If the negative pressure is established within the vapor chamber 14, the gas pressure within the flue gas chamber 13 may be equal to the atmospheric pressure, and the liquid surface level of the evaporating liquid in heat transfer area 11 should be 3 to 4 meters lower than that in the evaporation area 12. The vapor chamber 14 maintaining a negative pressure may reduce the total height of the apparatus, achieving a smaller size of the apparatus.

The space of the vapor chamber 14 may be set as large as possible according to the actual needs. For example, the width of the vapor chamber 14 may be larger than the width of the evaporation area 12, thereby improving the performance of entrainment control.

The housing 1 is provided with a liquid inlet 15, through which the liquid to be evaporated may be introduced into the interior of the housing 1.

The housing 1 is provided with a gas inlet 16 located below the liquid inlet 15, through which a combustion-supporting gas and a combustible gas (or a high-temperature flue gas) may be introduced into the interior of the housing 1. A combustor may be arranged below the liquid surface in the heat transfer area 11. The combustion-supporting gas and the combustible gas may be combusted in the combustor to obtain the high-temperature flue gas for heating the evaporating liquid.

The gas inlet 16 is connected with a gas distribution device 161. The gas distribution device 161 may tear the high-temperature flue gas introduced into the interior of the housing 1 into small bubbles so that the high-temperature flue gas fully contacts the evaporating liquid, thereby improving the heat transfer efficiency. The gas distribution device 161 may be located on a side of the flow deflector plate 3 where the heat transfer area 11 is located. As shown in FIG. 1, the gas distribution device 161 is located on the left side of the flow deflector plate 3.

Both the liquid inlet 15 and the gas inlet 16 open to the heat transfer area 11. The evaporating liquid is injected by the liquid inlet 15 into the heat transfer area 11 where it exchanges heat with the high-temperature flue gas, thereby the evaporating liquid is heated to a higher temperature. Meanwhile, a small amount of the evaporating liquid will be evaporated. A mixed gas of the small amount of vapor generated by evaporation and the flue gas floats in the evaporating liquid as bubbles and enters the flue gas chamber 13.

The bottom of the evaporation area 12 is a deposition area 18. Crystals formed in evaporation of the evaporating liquid may be deposited and gathered in the deposition area 18.

The evaporation process actually occurs mainly in vicinity of the liquid surface in the evaporation area 12. The area between the liquid surface in evaporation area 12 and the deposition area 18 is a main area for solid crystals deposited.

The housing 1 is provided with a drainage 17 which opens to the deposition area 18. The drainage 17 is configured to discharge the solid crystals gathered in the deposition area 18 out of the housing 1.

(Slope)

A slope 5 is formed at the bottom of the heat transfer area 11. In the direction from the heat transfer area 11 towards the evaporation area 12, the slope 5 is inclined downwardly, so that a small amount of solid crystals formed by evaporation in the heat transfer area 11 flows towards the deposition area 18 at the bottom of the evaporation area 12 due to gravity.

(Flow Deflector Plate)

A flow deflector plate 3 is provided within the housing 1. The flow deflector plate 3 is capable of guiding the flow direction of the evaporating liquid in the housing 1 such that the evaporating liquid is enabled to circulate in the heat transfer area 11 and the evaporation area 12 around the flow deflector plate 3. The arrow inside the housing 1 shown in FIG. 1 indicates the flow direction of the evaporating liquid. The evaporating liquid flows, within the area surrounded by the flow deflector plate 3, from the heat transfer area 11 towards the evaporation area 12, and flows, outside the area surrounded by the flow deflector plate 3, from the evaporation area 12 towards the heat transfer area 11.

The flow deflector plate 3 includes a first flow deflecting section 31 located in the heat transfer area 11 and a second flow deflecting section 32 located in the evaporation area 12. The first flow deflecting section 31 is inclined downwardly in the direction from the heat transfer area 11 towards the evaporation area 12, and the second flow deflecting section 32 extends in the up-and-down direction in the evaporation area 12. In the area surrounded by the flow deflector plate 3, the evaporating liquid flows from the heat transfer area 11 towards the evaporation area 12. The flow deflector plate 3 is substantially formed as a V shape. The separator plate 2 is located between the first flow deflecting section 31 and the second flow deflecting section 32 such that extends into the V-shaped area surrounded by the flow deflector plate 3.

A connection portion between the first flow deflecting section 31 and the second flow deflecting section 32 which is the bottom of the V shape is provided with a recess portion 33. Solid crystals in the area surrounded by the flow deflector plate 3 can be deposited and gathered at the recess portion 33. The recess portion 33 is connected with a discharge tube 34 which opens to the deposition area 18. The discharge tube 34 may be provided inclined towards the drainage 17 so that the solid crystals gathered in the recess portion 33 are guided towards the deposition area 18 and then discharged out of the housing 1 through the drainage 17, thereby facilitating collection of solid crystals and avoiding accumulation of solid crystals.

The first flow deflecting section 31 is connected with a baffle 35. The baffle 35 is located at the end (upper end) of the first flow deflecting section 31. The evaporating liquid may flow through the baffle 35 into the area surrounded by the flow deflector plate 3. At least a portion of the baffle 35 is located below the liquid surface in the heat transfer area 11. The baffle 35 is capable of preventing bubbles in the evaporating liquid flowing into the area surrounded by the flow deflector plate 3. For example, the baffle 35 may be formed as an orifice plate or an overflow weir.

(Venturi Injector)

A Venturi injector 6 comprises an injector liquid inlet 61, an injector liquid outlet 62 and an air suction port 63. The injector liquid outlet 62 and the injector liquid inlet 61 are located on both ends of a pipeline with a diameter decreasing from the ends towards the middle. The air suction port 63 is provided at the relatively narrow portion in the middle of the pipeline.

The injector liquid inlet 61 is communicated with the evaporation area 12 via a first pipeline 7. The injector liquid outlet 62 is communicated with the gas inlet 16. The air suction port 63 is communicated with the flue gas outlet 131 via the second pipeline 8. The first pipeline 7 is connected with a pump (not shown). The pump is capable of pumping the evaporating liquid in the evaporation area 12 to the Venturi injector 6 through the first pipeline 7. Then, the evaporating liquid returns to the heat transfer area 11 through the gas inlet 16.

The mixed gas discharged from the flue gas outlet 131 is sucked into the Venturi injector 6 via the second pipeline 8. The mixed gas is mixed with the evaporating liquid and then introduced into the interior of the housing 1. By reusing the mixed gas, it is possible to mix the flue gas with a part of the vapor, thereby suppressing evaporation of the evaporating liquid.

Since the Venturi injector 6 is capable of establishing a negative pressure at the air suction port 63, the mixed gas discharged from the flue gas outlet 131 is sucked into the Venturi injector 6. By means of the Venturi injector 6, the mixed gas can be directly introduced below the liquid surface with overcoming the pressure of the evaporating liquid.

Figure 2:
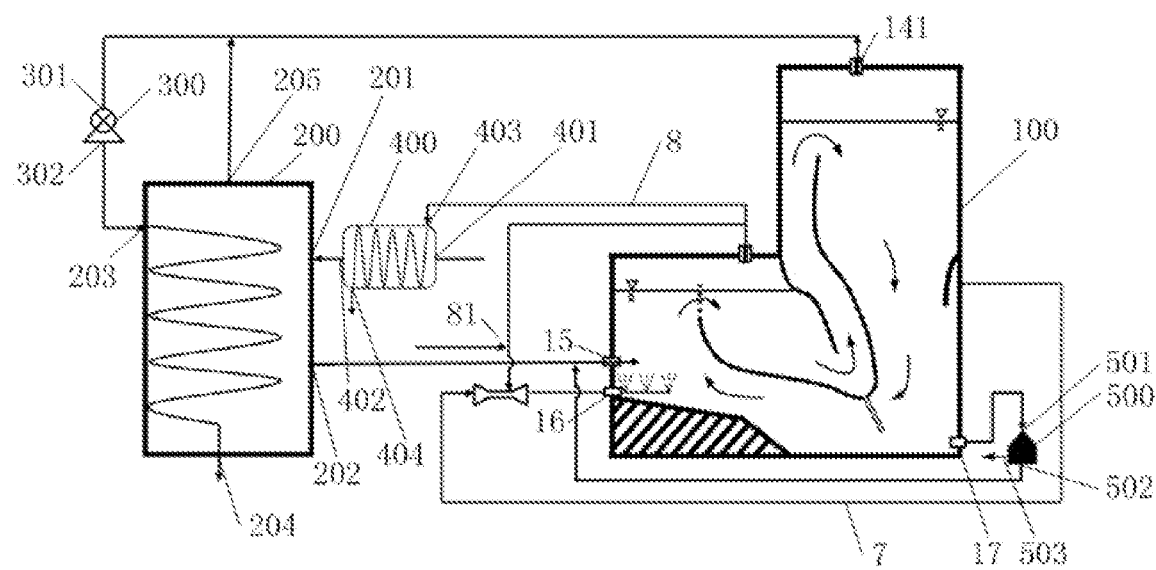
FIG. 2 is a structural diagram of a system of combined evaporation devices according to an embodiment of the present disclosure.

The second pipeline 8 is formed with a gas inlet 81 for introducing a combustible gas and a combustion-supporting gas (or a high-temperature flue gas). Two of the gas inlet 81 may be provided so that the combustible gas and the combustion-supporting gas may be introduced through the two gas inlets 81, respectively. Alternatively, there may be provided with only one gas inlet 81 (as shown in FIG. 2) through which the combustible gas and combustion-supporting gas (or the high-temperature flue gas) are introduced.

(Slag Trap Plate)

The slag trap plate 4 is provided on the inner wall of the housing 1. The slag trap plate 4 is located at the connection portion between the first pipeline 7 and housing 1. The upper portion of the slag trap plate 4 is connected to the inner wall of the housing 1 such that the evaporating liquid enters the first pipeline 7 from the lower portion and/or the side portion of the slag trap plate 4. Thereby suspending solid crystals are prevented from being sucked into the first pipeline 7.

The operating process of the evaporator for submerged combustion and delayed evaporation is described below.

As shown in FIG. 1, the evaporating liquid is introduced into the interior of the housing 1 via the liquid inlet 15. The combustion-supporting gas and the combustible gas (or the high-temperature flue gas) are sucked into the Venturi injector 6 and then introduced into the interior of the housing 1 via the gas inlet 16. The high-temperature flue gas is torn by the gas distribution device 161 into small bubbles to exchange heat with the evaporating liquid, so that the evaporating liquid is heated to a higher temperature.

In the heat transfer area, the heated evaporating liquid has a reduced density due to the increased temperature, which causes the evaporating liquid to flow upwards. The floating of the bubbles generated by the gas distribution device 161 also causes the evaporating liquid to flow upwards. Further, due to the action of the inflow of the evaporating liquid through the liquid inlet 15, the heated evaporating liquid passes through the baffle 35 and flows along the flow deflector plate 3 towards the evaporation area 12 into the substantially V-shaped area surrounded by the flow deflector plate 3. The first flow deflecting section 31 and the baffle 35 of the flow deflector plate 3 may prevent the bubbles in the evaporating liquid from flowing into substantially V-shaped area surrounded by the flow deflector plate 3. After flowing out of the area surrounded by the flow deflector plate 3, the evaporating liquid flows downwards in an area of the evaporation area other than the area surrounded by the flow deflector plate 3 (the right side of the flow deflector plate in FIG. 1). Outside the area surrounded by the flow deflector plate 3, the evaporating liquid in the evaporation area 12 returns to the heat transfer area 11, thereby making the evaporating liquid in the interior of the housing 1 to circulate.

Since the gas pressure within the vapor chamber 14 is lower than that in the flue gas chamber 13, the boiling point of the evaporating liquid in the evaporation area 12 is lower. The evaporating liquid that is heated in the heat transfer area 11 and flows towards the evaporation area 12 may boil and generate vapor. The vapor drives the evaporating liquid to flow upwards. The evaporated vapor in the evaporation area 12 is collected in the vapor chamber 14 and may be discharged through the vapor outlet 141 to be used. Pure vapor is an ideal pollution-free heat source that can be used as the heat source of the evaporator after being compressed, pressurized and heated to a higher temperature.

A small amount of the evaporating liquid will be evaporated in the heat transfer area 11. The mixed gas of vapor and flue gas is stored in the flue gas chamber 13. The mixed gas in the flue gas chamber 13 is sucked into the Venturi injector 6 through the second pipeline 8 and then introduced into the interior of the housing 1 to be reused. As such, the vapor content in the high-temperature flue gas is improved, thereby suppressing the evaporation of the evaporating liquid in the heat transfer area.

At least one of the following advantageous effects can be achieved by the foregoing technical solutions.

(1) Since the evaporator for submerged combustion and delayed evaporation is divided into two parts, the evaporating liquid may be mainly heated in the heat transfer (submerged combustion) area (a small amount of crystals may be produced) and the evaporating liquid is evaporated in the evaporation area, which facilitates the collection of pure vapor and the use of the latent heat of the vapor, thereby reducing the power consumption of the submerged combustion evaporator.

(2) The housing may be formed by splicing panels, of which the processing cost is lower than that of a cylindrical housing.

(3) Due to the flow deflector plate, the liquid naturally circulates by means of factors including floating of gas, temperature difference and the like, which saves the need of using a power plant, thereby saving energy.

(4) The mixed gas in the flue gas chamber is introduced into the interior of the housing to be reused, improving the vapor content in the high-temperature flue gas, thereby suppressing the evaporation of the evaporating liquid in the heat transfer area.

(5) In a direction from above towards below, the separator plate is inclined towards a side where the evaporation area is located, so that bubbles seldom enter the vapor chamber 14 on the side where the evaporation area 12 is located.

(Combined Evaporation Device)

As shown in FIGS. 1 and 2, the present disclosure further provides a system of combined evaporation devices, comprising an evaporator 100 for submerged combustion and delayed evaporation, a primary evaporator 200, a compressor 300, a preheater 400, and a slag-water separator 500.

(Evaporator for Submerged Combustion and Delayed Evaporation)

The evaporator 100 for submerged combustion and delayed evaporation has a liquid inlet 15, a gas inlet 16, a drainage 17, a flue gas outlet 131 and a vapor outlet 141.

(Primary Evaporator)

The primary evaporator 200 may use a vapor pressurized by the compressor 300 to perform primary evaporation and concentration for the evaporating liquid. The mechanical vapor compression evaporator as the primary evaporator 200 comprises a primary evaporator liquid inlet 201, a primary evaporator liquid outlet 202, a primary evaporator gas inlet 203, a primary evaporator gas outlet 204, and a primary evaporator drainage 205.

The primary evaporator liquid inlet 202 is connected with the liquid inlet 15. The primary evaporator is located at an upstream side of the evaporator 100 for submerged combustion and delayed evaporation. The primary concentrated liquid obtained from the evaporating liquid subjected to primary evaporation by the primary evaporator 200 is introduced into the evaporator 100 for submerged combustion and delayed evaporation as a final evaporator to be evaporated. The primary evaporator drainage 205 is connected with the pipeline between the compressor vapor inlet 301 and the vapor outlet 141 such that the discharged vapor is re-introduced into the primary evaporator 200 through the primary evaporator gas inlet 203 after being pressurized to perform primary evaporation and concentration for the evaporating liquid.

(Compressor)

The compressor 300 includes a compressor vapor inlet 301 and a compressor vapor outlet 302. The compressor vapor inlet 301 is connected with the vapor outlet 141, and the compressor vapor outlet 302 is connected with the primary evaporator gas inlet 203, such that the vapor generated by the evaporator 100 for submerged combustion and delayed evaporation evaporating the evaporating liquid is used by the primary evaporator 200 after being pressurized by the compressor 300.

(Preheater)

The Preheater 400 is provided with a preheater liquid inlet 401, a preheater liquid outlet 402, a preheater gas inlet 403, and a preheater gas outlet 404. The preheater gas inlet 403 is connected with the flue gas outlet 131. The mixed gas of flue gas and vapor discharged by the flue gas outlet 131 may be introduced into the preheater 400 to heat the evaporating liquid. The preheater liquid outlet 402 is connected with the primary evaporator liquid inlet 201. The heated evaporating liquid may be introduced into the primary evaporator 200 to be evaporated. The flue gas discharged from the preheater gas outlet 404 is at a relatively low temperature, facilitating collection and treatment.

(Slag-Water Separator)

The slag-water separator 500 is provided with a slag-water separator inlet 501, a slag-water separator liquid outlet 502, and a slag-water separator drainage 503. The slag-water separator inlet 501 is connected with the drainage 17. The slag-water separator liquid outlet 502 is connected with the liquid inlet 15. The slag-water separator drainage 503 is configured to discharge solid crystals. The slag-water separator 500 may separate solid crystals from liquid in the concentrated liquid discharged by the drainage 17. The concentrated liquid is introduced into the evaporator 100 for submerged combustion and delayed evaporation through the liquid inlet 15 to be further evaporated and concentrated.

The operating process of the system of combined evaporation devices is described below.

As shown in FIG. 2, the evaporating liquid is introduced into the preheater 400 through the preheater liquid inlet 401 to be heated. The mixed gas of flue gas and vapor discharged by the flue gas outlet 131 is introduced into the preheater gas inlet 403 to heat the evaporating liquid. The cooled mixed gas is discharged from the preheater gas outlet 404. The preheated evaporating liquid is discharged from the preheater liquid inlet 402 and then introduced into the primary evaporator 200 through the primary evaporator liquid inlet 201. The vapor discharged from the vapor outlet 141 is pressurized by the compressor 300 and then introduced into the primary evaporator gas inlet 203. The evaporating liquid is evaporated and concentrated by means of the pressurized vapor. The primary concentrated liquid obtained by the concentration is introduced by the preheater liquid outlet 202 into the downstream evaporator 100 for submerged combustion and delayed evaporation to be subjected to final evaporation and concentration. The secondary vapor generated by the primary concentration enters the compressor 300 through the drainage 205 so that the latent heat in the secondary vapor is recycled. The final concentrated liquid obtained by the concentration is introduced to the slag-water separator 500 for slag-water separation through the drainage 17. The separated liquid is re-introduced into the evaporator 100 for submerged combustion and delayed evaporation for further evaporation. The separated solid crystals are discharged from the slag-water separator drainage 503.

Although the present disclosure is explained in details with reference to the foregoing embodiments, one skilled in the art understands that the present disclosure is not limited to the embodiments described herein. The present disclosure can be implemented by modified embodiments with modifications made without departing from the concept and the scope of the present disclosure determined by the claims. Therefore, the description herein aims to illustrate the examples of the present disclosure and does not limit the present disclosure.

What is claimed is:

1. An evaporator for submerged combustion and delayed evaporation comprising:
   a housing formed with a space for containing an evaporating liquid;
   a separator plate arranged in an interior of the housing and dividing the housing into a heat transfer area based on submerged combustion and an evaporation area;
   a vapor chamber located above a liquid surface of the evaporation area;
   a flue gas chamber located above a liquid surface of the heat transfer area, wherein the flue gas chamber is provided with a flue gas outlet, the flue gas outlet is provided with a pressure valve which is capable of controlling a gas pressure within the flue gas chamber such that the gas pressure within the flue gas chamber is larger than a gas pressure within the vapor chamber, and a liquid surface level of the evaporating liquid in the evaporation area is higher than a surface level of the evaporating liquid in the heat transfer area.

2. The evaporator for submerged combustion and delayed evaporation according to claim 1, wherein the vapor chamber is provided with a vapor outlet which is connected with a vacuum pump, and the vacuum pump is capable of establishing a negative pressure within the vapor chamber.

3. The evaporator for submerged combustion and delayed evaporation according to claim 1, wherein in a direction from above towards below the separator plate, the separator plate is inclined towards a side where the evaporation area is located, so that the separator plate is capable of guiding bubbles existing and floating in the evaporating liquid to a side where the heat transfer area is located.

4. The evaporator for submerged combustion and delayed evaporation according to claim 1, further comprising:
a flow deflector plate including a first flow deflecting section located in the heat transfer area and a second flow deflecting section, wherein in a direction from the heat transfer area towards the evaporation area, the first flow deflecting section is inclined downwardly, and the second flow deflecting section extends in an up-and-down direction in the evaporation area.

5. The evaporator for submerged combustion and delayed evaporation according to claim 4, wherein the flow deflector plate is substantially formed as a V shape, the separator plate is located between the first flow deflecting section and the second flow deflecting section so as to extend into an area surrounded by the flow deflector plate, wherein a connection portion between the first flow deflecting section and the second flow deflecting section as a bottom portion of the V shape forms a recess portion which is connected with a discharge tube opening to a bottom portion of the evaporation area, solid crystals in the area surrounded by the flow deflector plate is deposited and gathered at the recess portion.

6. The evaporator for submerged combustion and delayed evaporation according to claim 4, wherein the first flow deflecting section is connected with a baffle located at an upper end portion of the first flow deflecting section, the baffle is capable of allowing the evaporating liquid to pass while blocking bubbles in the evaporating liquid.

7. The evaporator for submerged combustion and delayed evaporation according to claim 1, further comprising:
a Venturi injector including an injector liquid inlet, an injector liquid outlet, and an air suction port,
wherein the injector liquid inlet is communicated with the evaporation area via a first pipeline, the injector liquid outlet is communicated with the heat transfer area, and the air suction port is communicated with the flue gas outlet via a second pipeline,
wherein the first pipeline is connected with a pump for pumping the evaporating liquid in the evaporation area through the first pipeline to the heat transfer area via the Venturi injector, a gas discharged from the flue gas outlet is at least partially sucked into the air suction port of the Venturi injector and introduced into the heat transfer area with the evaporating liquid.

8. A system of combined evaporation devices comprising:
the evaporator for submerged combustion and delayed evaporation according to claim 1; and
a primary evaporator provided at an upstream side of the evaporator for submerged combustion and delayed evaporation, wherein an evaporating liquid is evaporated and concentrated by the primary evaporator and then introduced into the evaporator for submerged combustion and delayed evaporation.

9. The system of combined evaporation devices according to claim 8, further comprising a compressor including a compressor vapor inlet connected with a vapor outlet of the vapor chamber and a compressor vapor outlet connected with a primary evaporator gas inlet of the primary evaporator, wherein the primary evaporator is a mechanical vapor compression evaporator.

10. The system of combined evaporation devices according to claim 8, further comprising a preheater configured to heat the evaporating liquid and including a preheater liquid inlet, a preheater liquid outlet, a preheater gas inlet, and a preheater gas outlet, wherein the preheater liquid inlet is configured to introduce the evaporating liquid, the preheater gas inlet is connected with the flue gas outlet, and the preheater liquid outlet is connected with a primary evaporator liquid inlet of the primary evaporator so that the heated evaporating liquid is introduced into the primary evaporator.

11. A method for submerged combustion and delayed evaporation comprising the following steps:
using a separator plate to separate a space for containing an evaporating liquid to form a heat transfer area based on submerged combustion and an evaporation area which communicate with each other at a bottom portion;
introducing a combustion-supporting gas and a combustible gas or introducing a high-temperature flue gas into the heat transfer area;
making a first gas pressure within a flue gas chamber above a liquid surface of the heat transfer area to be larger than a second gas pressure within a vapor chamber above a liquid surface of the evaporation area by controlling a flue gas outlet of the flue gas chamber, and a liquid surface level of the evaporating liquid in the heat transfer area to be lower than a liquid surface level of the evaporating liquid in the evaporation area, wherein the evaporating liquid is heated in the heat transfer area and then evaporated in the evaporation area, a vapor generated by evaporating the evaporating liquid is collected in the vapor chamber.

12. The method for submerged combustion and delayed evaporation according to claim 11, further comprising arranging a combustor below a liquid surface in the heat transfer area based on submerged combustion where the combustion-supporting gas and the combustible gas are introduced into and combusted in to obtain a high-temperature flue gas.

13. The method for submerged combustion and delayed evaporation according to claim 11, further comprising using a flow deflector plate to guide a flow direction of the evaporating liquid such that the evaporating liquid is capable of circulating in the heat transfer area and the evaporation area around the flow deflector plate.

* * * * *